US008137644B2

(12) United States Patent
Hoell et al.

(10) Patent No.: US 8,137,644 B2
(45) Date of Patent: Mar. 20, 2012

(54) METHOD FOR THE ELIMINATION OF URANIUM (VI) SPECIES IN THE FORM OF URANYL COMPLEXES FROM WATERS

(75) Inventors: Wolfgang Hoell, Ettlingen (DE); Gunther Mann, Obrigheim (DE)

(73) Assignees: ATC, Obrigheim (DE); Rohm and Haas Company, Philadelphia, PA (US)

( * ) Notice: Subject to any disclaimer, the term of this patent is extended or adjusted under 35 U.S.C. 154(b) by 192 days.

(21) Appl. No.: 11/579,489

(22) PCT Filed: May 4, 2005

(86) PCT No.: PCT/EP2005/005032
§ 371 (c)(1),
(2), (4) Date: Aug. 27, 2007

(87) PCT Pub. No.: WO2005/108303
PCT Pub. Date: Nov. 17, 2005

(65) Prior Publication Data
US 2008/0112863 A1    May 15, 2008

(30) Foreign Application Priority Data

May 5, 2004 (DE) .......................... 10 2004 022 705

(51) Int. Cl.
*C01G 56/00* (2006.01)
*C22B 60/02* (2006.01)

(52) U.S. Cl. .............. 423/6; 423/1; 423/2; 423/3; 423/7

(58) Field of Classification Search .................. 423/6, 1, 423/2, 3, 7
See application file for complete search history.

(56) References Cited

U.S. PATENT DOCUMENTS

| 3,813,434 | A | * | 5/1974 | Marans .................. 562/554 |
| 4,118,457 | A | | 10/1978 | Seko et al. |
| 4,199,470 | A | * | 4/1980 | Yasuda et al. .................. 423/6 |
| 4,359,537 | A | * | 11/1982 | Chong ................. 521/29 |
| 6,210,078 | B1 | * | 4/2001 | Redwine et al. ............ 405/263 |
| 6,333,078 | B1 | | 12/2001 | Sugo et al. |
| 2003/0191201 | A1 | | 10/2003 | Feistel et al. |

OTHER PUBLICATIONS

Rohm and Haas, Amberlite IRA67 Product Data Sheet, PDS 0226 A, Apr. 1997, http://wetcoegypt.com/admin/upload/pdfs/ira67_metric.pdf.*
Rohm and Haas, Amberlite IRA67 Product Data Sheet, IE-478EDS, Dec. 2000, http://www.hopegood.com.tw/productlist/IRA67.pdf.*
Rohm and Hoss Amberlite IRA67RF Product Data Sheet, PDS 0444 A Jan. 2008 http://www.rohmhaas.com/assets/attachments/business/ier/ier_for_industrial_water_treatment/amberlite_ira67rf/tds/amberlite_ira67rf.pdf.*

* cited by examiner

*Primary Examiner* — Melvin Mayes
*Assistant Examiner* — Melissa Stalder
(74) *Attorney, Agent, or Firm* — Tifani M. Edwards

(57) ABSTRACT

The invention relates to a method for the removal of uranium (VI) species from waters by means of weakly basic, polyacrylic-based anion exchangers, said uranium(VI) species being present in the form of uranyl complexes as dissolved uranyl.

10 Claims, No Drawings

METHOD FOR THE ELIMINATION OF URANIUM (VI) SPECIES IN THE FORM OF URANYL COMPLEXES FROM WATERS

The invention relates to a method for the removal of uranium(VI) species from waters by means of weakly basic, polyacrylic-based anion exchangers, said uranium(VI) species being present in the form of uranyl complexes as dissolved uranyl.

Uranium is a radioactive and reactive heavy metal widely distributed on the earth. As a result of its reactivity, it is not found in nature in the form of the pure metal. Uranium compounds can be natural constituents of rocks and minerals, and also of water, soil and air. Uranium enters the natural hydrologic cycle e.g. by weathering of rock and also reaches rivers, lakes and oceans via the water. The concentration levels in natural waters depend on various factors such as contact time between water and rock, uranium content in the rock itself, redox conditions, availability of complexing ions in the water, etc.

In addition to the natural input, uranium is carried into the environment as a result of human activities. For example, sources are old tips of uranium mining and of the processing industry, but also combustion of fuels and coal, as well as application of uranium-containing phosphate fertilizers and emissions of the nuclear industry. Uranium occurs in nature with various valencies (+2, +3, +4, +5 and +6), but normally in its hexavalent form, bound to oxygen in the form of the uranyl ion ($UO_2^{2+}$), especially in the form of uranyl complex species which, in particular, are in the form of carbonato or sulfato complex species.

Uranium complex species of hexavalent uranium can be eliminated with high efficiency using conventional, strongly basic anion exchangers (usually based on polystyrene conditioned with chloride or sulfate ions) because, apart from iron, most of the impurities do not form any anionic complex species (Y. J. Song, Y. Wang, L. H. Wang, C. X. Song, Z. Z. Yang, A. Zhao, Recovery of uranium from carbonate solutions using strongly basic anion exchanger. 4. Column operation and quantitative analysis, Reactive & Functional Polymers 39 (1999), 245-252).

In natural waters usually including species of carbonic acid, it is carbonato complex species that are practically the predominant ones because they have higher stability than e.g. sulfato complexes. The experiments on elimination of uranyl complex species from natural waters, which have been described in the literature (e.g. by T. Sorg, Methods for removing uranium from drinking water, J. AWWA 1988, 105-111), have demonstrated that strongly basic anion exchangers in chloride form have a very high sorption capacity for uranium carbonato complex species. At raw water concentrations of 22-104 µg/L, a throughput of 9,000 to 60,000 bed volumes of water through corresponding filters was possible before the effluent concentration exceeded 1 µg/L. At a raw water content of 300 µg/L, the throughput before exceeding the 1 µg/L limit was 9,000 bed volumes.

In accordance with the general principles of ion exchange, the uranium species preferentially accumulate at the filter inlet. Related investigations have shown that the average loading of the exchanger material was 35.7 g/L (as $U_3O_8$). The corresponding activity was $7.8 \times 10^4$ pCi/g of dry resin.

Similarly, investigations in the USA (S. W. Hanson, D. B. Wilson, N. N. Gunaji, S. W. Hathaway, Removal of uranium from drinking water by ion exchange and chemical clarification, US-EPA Report EPA/600/S2-87/076, 1987) focused on the use of strongly basic, polystyrene-based exchanger resins in the chloride form. Using the example of carbonate complexes, sorption formally can be illustrated as follows:

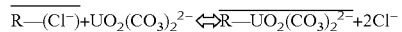

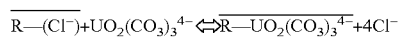

with R as exchanger matrix having the chloride functional group. The overlined symbols designate the exchanger phase. The symbol (Cl⁻) in brackets represents the stoichiometric amount of chloride ions.

Analogous findings were obtained in uranium recovery where uranyl carbonate species were virtually exclusively sorbed, and the exchanger, once exhausted, was practically completely loaded with same. The loadings achieved were about 80 g/L dry resin (as $U_3O_8$).

For the removal of uranyl sulfato complexes, strongly basic anion exchangers, preferably on the basis of polystyrene, in their sulfate form are also being used:

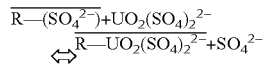

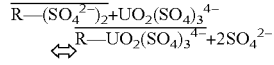

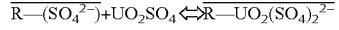

This achieves loadings comparable to those of sorption of carbonato complex species. The high loadings and long operating periods in the sorption of both carbonato and sulfato complex species result from the extremely high selectivity of the exchangers, particularly with tetravalent, negatively charged uranyl species.

As is well-known, regeneration or elution of the uranium species from the strongly basic anion exchangers must be carried out using solutions of NaCl, $NaNO_3$ or $(NH_4)_2CO_3$. Depending on the concentration and added volumes, removal efficiencies of from 40 to 90% are achieved. Uranium concentrations of up to 5 g/L (as U) are obtained in the eluates. The uranium is subsequently precipitated from the regenerates. To this end, the solution either must be added with strong acids or bases, or the uranium compounds must be reduced with hydrogen or precipitated by stripping with steam.

While strongly basic anion exchangers allow highly effective elimination of uranyl complex species in exchange for chloride ions and, in exceptional cases, sulfate ions, the use of these strongly basic exchangers is disadvantageous in that they reversibly change the water composition, sorbing and releasing both sulfate and (hydrogen) carbonate ions, so that the product water composition is not kept constant. These fluctuations have a disadvantageous effect in waterworks. Indeed, waterworks with large storage tanks possibly allow some buffering, but this causes additional efforts and costs, and smaller plants are not capable of balancing such fluctuations.

Another drawback of strongly basic exchangers lies in their regeneration which requires NaCl, $NaNO_3$ or $(NH_4)_2CO_3$ solutions, among which only NaCl is possible for cost reasons. However, addition of concentrated solutions in substantial stoichiometric excess is necessary, thereby obtaining major volumes of concentrated salt solutions as waste, the disposal of which is problematic. In particular, this applies to smaller waterworks.

The invention is therefore based on the object of developing a method for the removal of uranium(VI) species from water, which method avoids the above-mentioned drawbacks and restrictions of the prior art. More specifically, a method is to be provided which solely removes the uranyl complex species without changing the composition of the remaining water.

The invention is achieved by means of the method described in claim 1. Preferred embodiments of said method are specified in the dependent claims.

The method of the invention is based on the fact that uranium predominantly occurs in its hexavalent oxidation state and thus in the form of negatively charged uranyl complex species. Complexing of the uranyl proceeds in aqueous solution, depending on the pH value and presence of appropriate ligands. In water containing $CO_3^{2-}$, uranyl carbonate complexes are the dominant species. Accordingly, the uranyl carbonato complex species present in the waters and intended to be removed are those having the structures $UO_2(CO_3)_2^{2-}$ and $UO_2(CO_3)_3^{4-}$.

Moreover, natural waters also contain other ligands, so that the uranyl complexes are also present in the form of e.g. sulfato complex species, such as $UO_2(SO_4)_2^{2-}$ and $UO_2(SO_4)_3^{4-}$, or as phosphato complexes, such as $UO_2(HPO_4)_2^{2-}$, but also in the form of chlorides or fluorides.

Cationic uranium species are found in reduced waters only. However, such waters normally contain iron which must be removed by aeration or oxidation and filtration before contact with ion exchanger is made, and it can therefore be assumed that the cationic uranium species are likewise converted into anionic uranyl complex species during this process.

More specifically, the method of the invention is directed to the removal of uranyl complex species of general formula $[UO_2(X)]^{y-}$ wherein X represents anions of natural waters, preferably $Cl^-$, $F^-$, $CO_3^{2-}$, $(HCO_3)^-$, $(SO_4)^{2-}$, $(HPO_4)^{2-}$, and y preferably represents 1 to 4.

The object of the invention is accomplished by using weakly basic, polyacrylic-based anion exchangers in the form of the free base for removal of uranium(VI) species in the form of uranyl complexes from waters.

For uranyl complex elimination, a weakly basic anion exchanger on the basis of polyacrylamide is preferably employed. According to the invention, this is preferably a weakly basic, polyacrylamide-based exchanger of general formula

R—(NR'$_2$×H$_2$O)

wherein R assumes the function of a polyacrylic exchanger matrix and R' represents hydrogen, substituted or unsubstituted alkyl ($C_1$-$C_8$) or substituted or unsubstituted aryl, with tertiary amines preferably acting as exchange-active groups. In a preferred embodiment of the invention the exchanger is a modified tertiary amine-acrylic copolymer, more preferably a tertiary amine-acrylic-divinylbenzene copolymer.

In a particularly preferred fashion the weakly basic anion exchanger is present as a type of gel.

Furthermore, the exchangers used according to the invention are preferably characterized by an overall capacity of ≧1.6 mol/L (free base form), a moisture content of 56 to 65% (free base form), and a density of 1.030 to 1.090 (free base form), and have a preferred bulk density of 700 g/L.

Preferred grain sizes of the weakly basic anion exchanger are characterized by the following features:

| | |
|---|---|
| Harmonic mean | 500-750 μm |
| Uniformity coefficient | ≦1.8 |
| Fines content | <0.300 mm: 3.0% max. |
| Coarse beads | >1.180 mm: 5.0% max. | or

| | |
|---|---|
| Harmonic mean | 700-950 μm |
| Uniformity coefficient | ≦1.7 |
| Fines content | <0.355 mm: 0.5% max. |
| Coarse beads | >1.180 mm: 5.0-25.0% max. |

In a particularly preferred fashion, weakly basic ion exchanger resins from Rohm and Haas Company are employed, which are sold under the name Amberlite® IRA67 and IRA67RF.

With the anion exchangers preferably used, which can be employed in their free base form with no additional conditioning, sorption of the uranyl complex species proceeds without release of e.g. chloride or sulfate ions, as is the case when using conditioned, strongly basic exchangers of the prior art.

Surprisingly, it is almost exclusively uranyl complex species that undergo sorption, with carbonate complexes prevailing as a result of their greater stability. The reaction taking place will therefore be illustrated with reference to uranyl carbonato complexes:

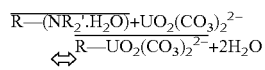

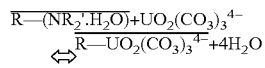

wherein R and R' have the meanings specified above.

The inventive use of said weakly basic anion exchangers is advantageous in that removal proceeds unilaterally and no exchange occurs except for water constituents.

As to the technical implementation of this method, a conventional filter array is a preferred option for practical reasons. In principle, other arrays such as throughflow stirred tanks are also possible.

In addition, the use of weakly basic anion exchangers in pure base form with no additional conditioning is highly advantageous in that regeneration of the exchanger can be carried out using NaOH alone. Here, advantage is taken of the fact that weakly basic exchangers are unprotonated at high pH values, thus being incapable of sorbing anions. Owing to the massive deprotonation at high pH values, only small volumes of regenerates are obtained which can easily be disposed of.

Using the example of a carbonato complex, regeneration can formally be illustrated as

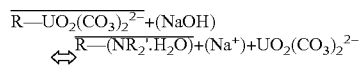

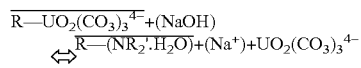

The handling of NaOH is easy in technological terms, and there is no conditioning of the exchanger. Instead of regeneration, direct disposal of the loaded filter material is also possible.

The present method is used to remove uranium(VI) species, especially in waters employed in drinking-water production. In a preferred fashion, this relates to ground or surface water.

The weakly basic, polyacrylic-based anion exchangers used according to the invention and employed in free base form without any conditioning achieve high loading and long operating periods for the sorption of, in particular, carbonato and sulfato complex species. However, successful elimination of phosphato complexes and chloride and fluoride compounds is also possible.

These results are obtained by virtue of the extremely high selectivity, especially for these uranium(VI) species, of the exchangers used according to the invention. The uranyl complex species can be removed effectively at pH values between 5.8 and 8.0. The efficiency in this field, which is particularly important for drinking-water treatment, corresponds to the elimination by means of conditioned, strongly basic exchangers based on polystyrene or shows improved values compared to strongly basic, polystyrene-based ion exchangers, the use of which is well-known. In addition to the advantages mentioned above, this successful way of using weakly basic, polyacrylic-based exchangers in their free base form involves further advantages. Regeneration, or elution of the uranium species from the weakly basic anion exchangers, is effected by adding NaOH, and the uranium can be eluted almost completely. Uranium concentrations of up to ½ of the concentrations on the adsorber material are achieved in the eluates.

With reference to the following example, the invention will be illustrated in more detail below.

EXAMPLE

A filter with an inner diameter of 12.5 cm was filled up to a packing height of 79 cm with 9.7 liters (L) of a modified tertiary amine-acrylic copolymer (Amberlite® IRA67 from Rohm and Haas Company), which represents a weakly basic, polyacrylamide-based exchanger material according to the invention, and a uranium-containing natural ground water was passed therethrough at a flow rate of 60 L/h. The uranium concentration of the natural ground water was about 9 to 17 µg/L. After an operating period of four months and a throughput of 17,600 bed volumes in total, corresponding to a volume of about 169 m$^3$, the uranium concentration in the effluent was still below 0.1 µg/L.

The invention claimed is:

1. A method for the removal of uranium (VI) species in the form of uranyl complexes from waters, characterized in that the waters containing the uranyl complexes are contacted with at least one weakly basic, polyacrylic-based anion exchanger in its free base form, wherein the at least one weakly basic, polyacrylic-based anion exchanger absorbs said uranyl complexes.

2. The method according to claim 1, characterized in that the uranyl complexes to be removed are carbonato complexes, sulfato complexes, phosphato complexes, chloride and fluoride complexes.

3. The method according to claim 1, characterized in that a weakly basic anion exchanger on the basis of polyacrylamide is employed.

4. The method according to claim 3, characterized in that the anion exchanger on the basis of polyacrylamide is a tertiary amine-acrylic-divinylbenzene copolymer.

5. The method according to claim 1 characterized in that the weakly basic anion exchanger is present as a type of gel.

6. The method according to claim 3, characterized in that the weakly basic anion exchanger has an overall capacity of $\geq 1.6$ mol/L (free base form), a moisture content of 56 to 65% (free base form) and a density of 1.030 to 1.090 (free base form).

7. The method according to claim 3, characterized in that the weakly basic anion exchanger has a bulk density of 700 g/L.

8. The method according to claim 3, characterized in that the grain size of the weakly basic anion exchanger is characterized by the following features:

| | |
|---|---|
| Harmonic mean | 500-750 J.tm |
| Uniformity coefficient | 51.8 |
| Fines content | <0.300 mm: 3.0% max. |
| Coarse beads | >1.180 mm: 5.0% max. |

9. The method according to claim 3, characterized in that the grain size of the weakly basic anion exchanger is characterized by the following features:

| | |
|---|---|
| Harmonic mean | 700-950 J.tm |
| Uniformity coefficient | 51.7 |
| Fines content | <0.355 mm: 0.5% max. |
| Coarse beads | >1.180 mm: 5.0-25.0% max. |

10. The method according to claim 1, characterized in that the weakly basic anion exchanger is used in a filter array through which the water is passed that contains the uranyl complex species to be removed.

* * * * *